United States Patent
Garverick et al.

(10) Patent No.: US 6,788,981 B2
(45) Date of Patent: Sep. 7, 2004

(54) MULTIPLEXED ANALOG CONTROL SYSTEM FOR ELECTROSTATIC ACTUATOR ARRAY

(75) Inventors: Steven L. Garverick, Solon, OH (US); Jun Guo, Los Altos Hills, CA (US); Narayanan Rajan, Cleveland Heights, OH (US)

(73) Assignee: Movaz Networks, Inc., Norcross, GA (US)

( * ) Notice: Subject to any disclaimer, the term of this patent is extended or adjusted under 35 U.S.C. 154(b) by 213 days.

(21) Appl. No.: 09/949,436

(22) Filed: Sep. 7, 2001

(65) Prior Publication Data

US 2002/0106144 A1 Aug. 8, 2002

Related U.S. Application Data

(60) Provisional application No. 60/267,288, filed on Feb. 7, 2001.

(51) Int. Cl.[7] .............................................. G05B 11/01
(52) U.S. Cl. .............................. 700/19; 385/16; 700/10
(58) Field of Search .................. 700/10, 19; 385/16–18, 385/24; 359/872, 874

(56) References Cited

U.S. PATENT DOCUMENTS

| | | | | |
|---|---|---|---|---|
| 5,061,049 A | * | 10/1991 | Hornbeck .................... 359/224 |
| 5,170,283 A | | 12/1992 | O'Brien et al. ............. 359/291 |
| 5,285,407 A | * | 2/1994 | Gale et al. ............. 365/189.11 |
| 5,467,146 A | * | 11/1995 | Huang et al. ................ 348/743 |
| 5,521,746 A | | 5/1996 | Engle .......................... 359/292 |
| 5,546,128 A | * | 8/1996 | Nakagakiuchi et al. ..... 348/362 |
| 5,670,977 A | * | 9/1997 | Chiu et al. ..................... 345/85 |
| 5,760,755 A | | 6/1998 | Engle ........................... 345/85 |
| 5,796,508 A | * | 8/1998 | Suzuki ........................ 359/224 |
| 6,037,719 A | * | 3/2000 | Yap et al. ................. 315/169.3 |
| 6,072,608 A | * | 6/2000 | Psaltis et al. ................. 359/22 |
| 6,097,859 A | * | 8/2000 | Solgaard et al. .............. 385/17 |
| 6,191,883 B1 | * | 2/2001 | Huffman et al. ............. 359/291 |
| 6,379,510 B1 | * | 4/2002 | Kane et al. ............. 204/192.34 |
| 6,396,711 B1 | * | 5/2002 | Degani et al. .............. 361/760 |
| 6,529,311 B1 | * | 3/2003 | Bifano et al. ................ 359/291 |
| 6,543,286 B2 | * | 4/2003 | Garverick et al. ....... 73/514.18 |
| 2002/0149834 A1 | * | 10/2002 | Mei et al. .................... 359/295 |

FOREIGN PATENT DOCUMENTS

WO      WO 01/61400      8/2001

* cited by examiner

*Primary Examiner*—Ramesh Patel
*Assistant Examiner*—Ron D Hartman, Jr.
(74) *Attorney, Agent, or Firm*—Charles S. Guenzer (57) ABSTRACT

A multiplexed analog control system for an micro electromechanical systems (MEMS) array of electrostatic actuators, such as tiltable mirrors in an optical switch. Each actuator includes a variable gap capacitor formed as part of the movable mechanical element. A hold capacitor is connected to each actuator capacitor, and a selectable high-voltage inverter connects them to provide a bipolar drive signal of 50% duty cycle. A single power digital controlled current source is connected to all the drive circuits to provide a high-power correction signal. Address decoders enable a selected one of the drive circuits to add or subtract the correction from the hold capacitor.

4 Claims, 5 Drawing Sheets

MULTIPLEXED ANALOG CONTROL SYSTEM FOR ELECTROSTATIC ACTUATOR ARRAY

RELATED APPLICATION

This application claims benefit of U.S. Provisional Application Serial No. 60/267,288, filed Feb. 7, 2001.

BACKGROUND OF THE INVENTION

1. Field of the Invention

The invention relates generally to the control of arrays of electrostatic actuators. In particular, the invention relates to the digital control of micro electromechanical arrays of optical elements.

2. Background Art

Micro electromechanical systems (MEMS) utilize fabrication techniques developed in the semiconductor integrated circuit industry to produce very small mechanical systems, typically formed in a silicon wafer. One application that has prompted much interest in MEMS technology is optical communication using wavelength division multiplexing (WDM), although the invention is not limited to this application. A WDM communication system transmits multiple optical signals of different wavelengths on a single optical fiber, each wavelength carrier having its own data signal impressed thereupon. It is desired to create complex optical networks in which nodes of the network switch signals in different directions according to the wavelength of the signal and without the necessity to convert the optical signal to electrical form to effect the switching. The most typical form of such a switch includes a wavelength demultiplexer, such as a diffraction grating, which spatially separates the WDM signal into multiple optical beams of respective optical wavelength. These beams are separately and independently switched to wavelength multiplexers associated with the output fibers to form output WDM signals. Thus, an optical switch is needed having a number of independently controllable optical switching elements at least equal to the number of WDM channels, a number being pushed to 100 and higher.

Such a MEMS optical switch by Solgaard et al. in U.S. Pat. No. 6,097,859 and by Tomlinson et al. in U.S. Pat. No. 5,960,133. Both references use an array of mechanically movable mirrors formed from a silicon wafer. Each of the mirrors in the array are electrostatically controlled by a capacitor formed between a bendable mechanical element bearing the mirror and a control electrode formed under the mechanical element. It is known to have an array of gimbaled mirrors formed generally in the plane of the wafer but independently tiltable about two orthogonally arranged pairs of torsion bars as controlled by multiple capacitors formed under the mirror and its gimbal frame.

Such a MEMS switch or other type of array of MEMS elements requires the fabrication of large arrays of electronic microactuators to control the movement of the mechanical elements. Voltages of approximately 100V are typically required. MEMS capacitors that are DC biased tend to exhibit a charging effect which eventually prevents further actuation. Accordingly, the driving signals are preferably bipolar (AC). Further, the MEMS electromechanical elements and microactuators suffer from variations in their manufacturing and in environmental effects. Accordingly, the control systems needs to be able to separately tune the multiple microactuators.

High-voltage amplifiers and DC-to-AC converters are commercially available, and a control system can be easily implemented on a computer to set and adjust the amplitude of the voltage that drives a single microactuator. However, such an approach is not feasible in a commercial implementation of a MEMS array having a large number of array elements because the size and cost of the control system quickly overwhelm the MEMS array, which itself can be implemented on a single silicon chip.

Furthermore, the number of I/O lines needs to be constrained despite the requirement that each of the microactuators is independently controllable.

It is highly desirable that large parts of the control system be implemented on the same structure as are the MEMS elements and with the same pitch and approximately the same size. Nonetheless, the control system must accommodate the requirement of a high-voltage driver switching voltages and powers significantly greater than those associated with typical silicon control circuitry.

SUMMARY OF THE INVENTION

An analog control system for an array of movable mechanical elements, such as tiltable mirrors, formed in a micro electromechanical systems (MEMS). The movable elements may form part of variable gap actuator capacitors, whereby electrostatic actuators move the mechanical elements.

In each cell of the array, a hold capacitor is associated with each actuator capacitor. Control circuitry determines the amount of charge or voltage on each hold capacitor, preferably by incrementing and decrementing charge according to either a new state configuration or correcting the position in a feedback loop probing the output of the MEMS cell.

The power signal for updating the hold capacitor charge may be supplied from a single source, preferably in analog form controlled by a digital to analog converter, to separate drive circuits associated with each cell. An address decoder enables only one of the drive circuits to pass the power signal to the hold capacitor.

Preferably, an inverter couples the hold capacitor to the actuator capacitor, thereby allowing the actuator capacitor to be driven by a bipolar signal having equal positive and negative components.

The microactuators and electrostatic drivers are preferably formed in a single bonded structure in two dimensional arrays having the same pitch.

DETAILED DESCRIPTION OF THE PREFERRED EMBODIMENTS

Figure 1:
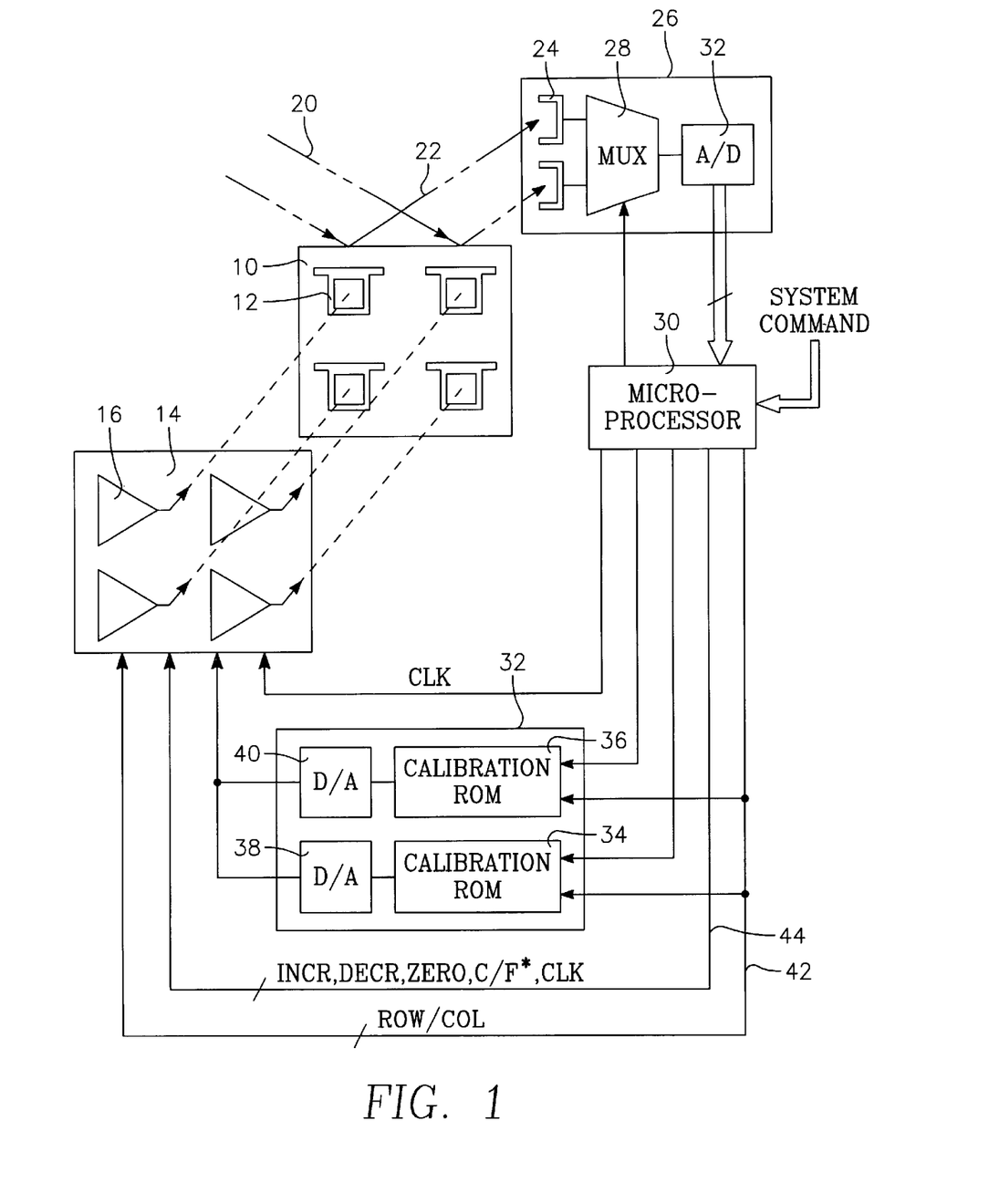
FIG. 1 is a schematic diagram of the MEMS optical switch, its microactuators, and its control system according to one embodiment of the invention.

The invention is applicable to a variety of micro electromechanical systems (MEMS) that include a number of separately actuatable elements, such as valves and pumps, requiring a high-voltage actuation signal. However, the discussion will be chiefly restricted to an embodiment including electrostatically actuatable mirrors particularly useful as an optical switch in a wavelength division multiplexing (WDM) optical communication network. An overall schematic diagram of a MEMS switching system including mirrors, microactuators, and a control system is illustrated in FIG. 1. An electrostatic actuator (ESA) array 10 includes an array of mirrors 12 and an unillustrated array of microactuators closely associated with the mirrors 12. The ESA array 10 may be a micromachined silicon-based chip, that is, a MEMS. Although the intended array for a WDM optical switch may include hundreds or even thousands of array elements, only a 2×2 array is shown in FIG. 1. As will become evident later, the control system scales gracefully with greatly increased size of the array.

The schematic diagram of FIG. 1 shows mirrors 12 which are tiltable only about one axis located at a side of the mirror, thereby requiring only one electrode, that is, one microactuator per mirror. This configuration is possible though not preferred but is discussed in order to simplify the description of the control features of the invention. The generalization to two or four microactuators per mirror tiltable about two axes is readily and easily made.

An ESA driver array 14 associated with the ESA array 10 includes one or more ESA drivers 16 for each mirror 12 in the ESA array. Because of the electrostatic actuation of moderately large mirrors, the ESA driver array 14 typically includes high-voltage circuitry which may be implemented in a high-voltage integrated circuit (HVIC). Preferably the MEMS array 10 and at least part of the ESA driver array 14 are formed in a bonded vertical structure with high-voltage lines vertically linking the drivers 16 and the actuators of its associated mirror 12 The orthogonal wiring avoids the interconnect bottleneck which occurs when large arrays of devices are interconnected in the planar technology associated with large-scale MEMS. The ESA driver array 60 may be formed on a separate substrate that is bonded under the ESA array 10 or it may be formed in one of the layers of a multi-layer implementation of the ESA array. In either case, however, the ESA drivers 62 are arranged in rows and columns on the same pitch as the array 10 of mirrors 12 and should not be significantly larger than the mirrors 12. This pitch matching and physical proximity allows the interconnection between each high-voltage driver and its associated microactuator to be made in the dimension orthogonal to the plane. All other interconnects in the system can be implemented using more conventional means requiring a limited number of wires much fewer than the number of array elements. Only four drivers 62 are illustrated, but the number of control lines, as described below, increases only slowly with increasing size of the array due to the multiplexed control to be described below.

The control system is designed to allow the microactuators to control the mirrors at two levels; one to effect switching between multiple output ports by discrete tilt positions, the other to provide smaller adjustment of the tilt position to tune the optical coupling at a given switch state. The tuning assumes that the mirror position be monitored. For example, as shown FIG. 1 two input beams 20 are reflected off respective ones of the mirrors 12 into output beams 22. The direction of one of the output beams is associated with a selected output port. Thereby, the tilt angle of the mirrors 12 determines the output port to which the input beam is directed. Only two input beams 20 are illustrated, but their number generally corresponds to the number of mirrors 12 in the ESA array 10. However, in a preferred system, a separate mirror 12 is associated with each input port and another mirror 12 with each output port, and the beams of the two mirrors are coupled through a folding mirror. Unillustrated beam splitters or optical fiber taps split off a portion of each of the output beams to respective optical detectors 24 in an ESA monitoring system 26, alternatively called an optical performance monitor. The outputs of the optical detectors 24 are connected to the input of an analog multiplexer 28 controlled by a microprocessor controller 30, which selects one of the optical channels for input to an analog-to-digital (A/D) converter 32. The multi-bit output of the A/D converter is input to the microprocessor 30 as a measure of the intensity of the selected output beam 22.

The microprocessor 30 also receives system commands including baseline positions of the ESA elements, that is, instructions for the tilt angles of the mirrors 12 associated with the selected output ports. The microprocessor 30 then controls tilt of the mirrors 10 in the ESA array 10 through an ESA driver interface 32 and the ESA driver IC 14. In one embodiment, the control outputs of the microprocessor 30 are digital signals divided into a coarse adjustment corresponding to the baseline switching positions dictated by the system commands and a fine adjustment resulting from the tuning information derived in part from the ESA monitoring system 26 and in part from refreshing characterizations to be described later. The coarse and fine adjustment information is supplied to respective calibration read-only memories (ROMs) 34, 36. The digital outputs of the calibrations ROMs 34, 36 are digitized by respective digital-to-analog (D/A) converters 38, 40. The calibration ROMs, although not required, are useful for permanently or semi-permanently storing calibration data experimentally determined from each of the ESA elements, which are subject to significant variation in manufacture as are the drivers 16 of the ESA driver array 14. The calibration ROMs could be programmed during a factory calibration step in which the exact codes needed to obtain desired actuator positions are measured. Alternatively, the ROMs can be replaced with read/write memory and the microprocessor can periodically update the calibration memory based on present control adjustments.

The D/A converters 38, 40 may be used to provide the high voltage signals used in switching the power electronics located next to the microactuators, which may be in the vicinity of 100V. As a result, the D/A converters tend to have large area and consume substantial power although for electrostatic actuation relatively little drive current is required.

Although it is possible to use a single D/A converter and associated calibration ROM, the course and fine analog correction voltages are of different magnitudes and would require an excessively large dynamic range for a single D/A converter. The two D/A converters also allow multiplexed course and fine corrections, which is particularly advantageous when the baseline positions are changed only infrequently.

The control system is preferably implemented for time-multiplexed control of the large number of ESA elements. Row and column select signals are transmitted on a ROW/COL select signal on an address bus 42, preferably as a multi-bit address when a large number of ESA elements are being controlled. The decoding of the addresses can be performed at the input to the ESA driver IC 14.

The control system is also preferably designed for local storage of actuator position in an analog memory capacitor.

That is, the amount of charge or voltage $V_H$ on the capacitor determines the mirror angle. Accordingly, in view of the relative infrequency of changing a switching state in many applications, the ESA control system preferably issues corrections (that is, increments and decrements) $\Delta V_H$ of the stored charge from its current value. To accommodate such an incremental control, five additional signals are supplied from the microprocessor 30 on a control bus 44 to the ESA driver IC in synchronism with the ROW/COL select signal and the fine and coarse adjustment signals. An increment signal INCR states that the outputs of the ESA driver interface 40 represent an amount of increment while a decrement signal DECR states they represent an amount of decrement. A reinitialization signal ZERO is issued when the charges associated with the fine and coarse adjustments are to be zeroed out and the mirror returned to its neutral state. This function is useful to overcome accumulating errors arising from charge leakage and the like. If desired, a course/fine select signal (C/F*) may be used to multiplex the course and fine adjustments in the ESA driver array 14.

The microprocessor 30 or other control circuitry supplies an ESA clock signal CLK to the ESA driver array 14 to control the bipolar pulsing or chopping between $+V_H$ and $-V_H$ desired for electrostatic actuators. Nonetheless, the control circuitry delivers a multiplexed unipolar signal setting the amplitude of the bipolar signal in the local capacitor memory.

The parts of the overall system of FIG. 1 will now be described in more detail.

Figure 2:
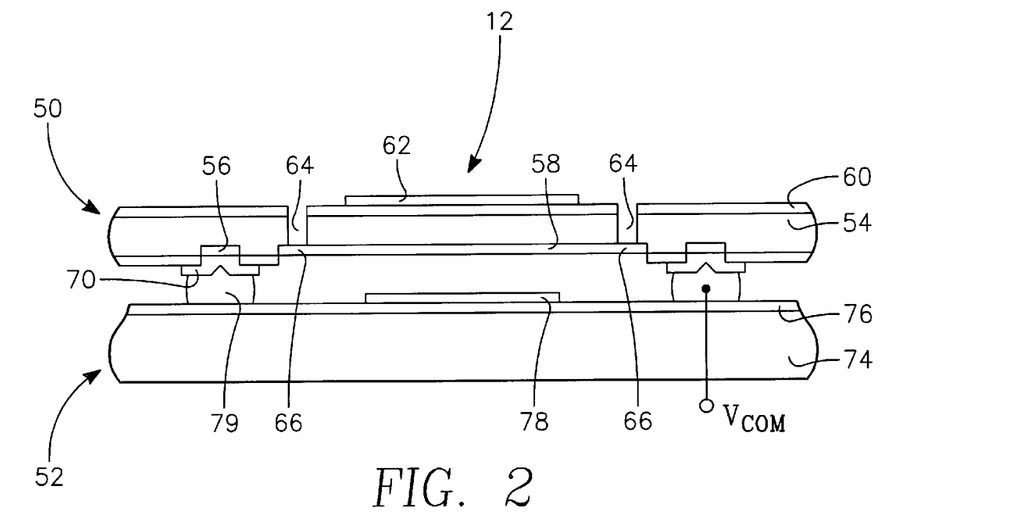
FIG. 2 is a cross-sectional view of an element of the array of MEMS elements showing both the mirror and the microactuator for moving the mirror.

Although the invention is not limited to optical switches or to optical switches formed in a particular manner, one optical switch may be formed by a dual-chip stack approach as disclosed by Rajan et al. in U.S. Provisional Application Serial No. 60/273,651 filed Mar. 5, 2001. In FIG. 2 is illustrated in cross-sectional view a simplified element in the ESA array 10 fabricated by the dual-chip stack approach. It is formed from two silicon on insulator (SOI) substrates 50, 52, each including a crystalline silicon substrate (wafer), an insulating silica layer, and a thin epitaxial silicon layer formed over the insulating layer. The top SOI substrate 50, for which the silicon substrate has been removed, includes an epitaxial silicon layer 54, facing downwardly and having selectively patterned surface portions 56, 58 which have been ion implanted. An insulating layer 60 overlies the epitaxial silicon layer 54 and a reflective metallic layer 62 is deposited over the insulating layer 60 to form the mirror 12 of this element of the array. An annular gap 64 is formed through the insulating layer 60 and the epitaxial silicon layer 54. However, the central doped area 58 includes two narrow torsion beam areas 66 which are not etched by the selective process forming the annular gap 64 so that the mirror 12 is rotatably supported by two torsion beams and can thus tilt about a horizontal axis of the two torsion beams in the plane of the illustration. Metal contacts 70 are formed to the outer doped regions 56.

The lower substrate 52 includes a silicon substrate 74, an insulating layer 76, and two metal electrodes 78 (only one of which is illustrated) formed symmetrically about the axis of the torsion beams 66. The two SOI substrates 50, 52 are joined together by solder bumps 79, which also provide electrical contact through the contacts 70 to the central doped region 58, which is held at a common potential, typically ground, to act as a common electrode in opposition to the two electrodes 78 of the two capacitors that are formed. These electrodes 78 are separately electrically controlled to tilt the mirror 12 in one direction or the other about the axis of the torsion beams 66.

The preferred configuration of a gimbaled mirror tiltable about two axes can be easily extended from the structure of FIG. 2 by adding an intermediate tiltable frame, a second pair of perpendicularly arranged torsion beams and two more bottom electrodes beneath the frame.

Figure 3:
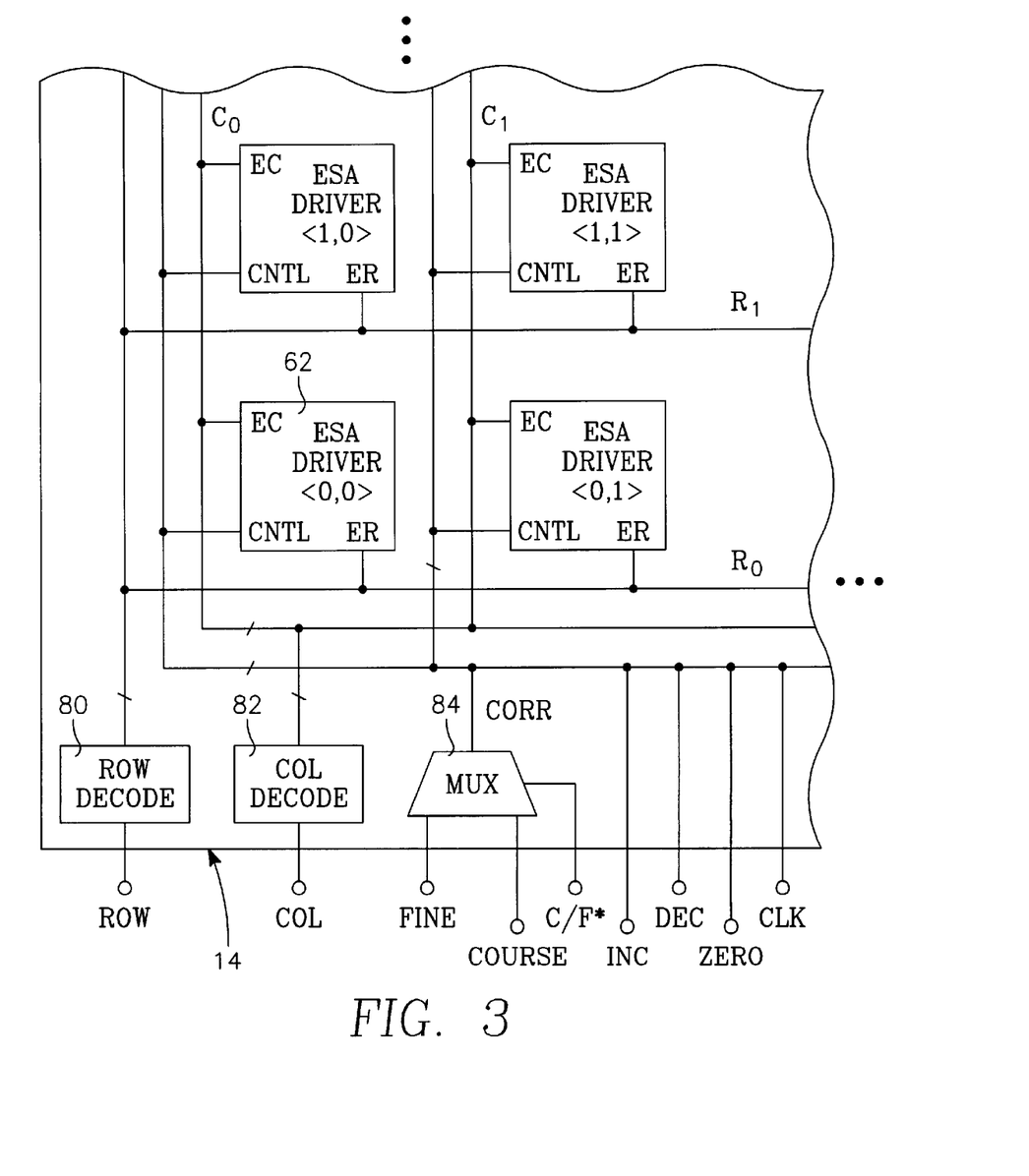
FIG. 3 is a schematic diagram of an array of actuator drivers.

A schematic diagram of the ESA driver array 14 is shown in more detailed in FIG. 3. The multiplexed addressing control architecture allows the number of I/O lines linking the ESA driver array 14 and the rest of the control circuitry of FIG. 1 to be minimized. A row decoder 80 decodes a usually multi-bit ROW signal into separate ROW enable lines $R_0$, $R_1$, etc., and a column decoder 82 decodes a usually multi-bit COL signal into separate COL enable lines $C_0$, $C_1$, etc. Of course, in the simplified case of a 2×2 array, the ROW and COL signals require a single bit apiece. The number of addressing bits increases with $\log_2$ of the array size, for example, 10 bits for an array size of 1024. Each of the ESA drivers includes an row enable input ER and a column enable input EC connected to respective ones of the ROW and COL signals. Both the enable inputs ER, EC need to be enabled to enable the particular driver 62 addressed by the ROW and COL signals.

The fine and coarse adjustment signals are supplied to an analog multiplexer 84 under the control of the course/fine select signal C/F*. The selected analog correction signal CORR and the other control signals INCR, DECR, ZERO, and CLK are supplied to the driver control inputs CNTL of all the ESA drivers 62.

The ESA drivers 62 are preferably formed in the bonded structure of FIG. 2, either in a silicon portion of the lower SOI substrate 52 or in another SOI substrate bonded below the lower SOI substrate 52. It is further preferred that the ESA drivers 62 are formed in a two-dimensional array in correspondence to the two-dimensional array of microactuators associated with the mirrors and that the pitches of the two arrays are the same. Preferably, the pitches in both dimensions are the same, but size constraints may limit pitch matching to one dimension. For the optical mirror switch being contemplated, there are typically a few columns of switches corresponding to the optical ports and a large number of rows corresponding to the WDM wavelengths. As a result, arranging the two arrays to have the same pitch in the wavelength direction but offsetting circuitry in the port direction still substantially reduces the switched high-voltage runs.

Figure 4:
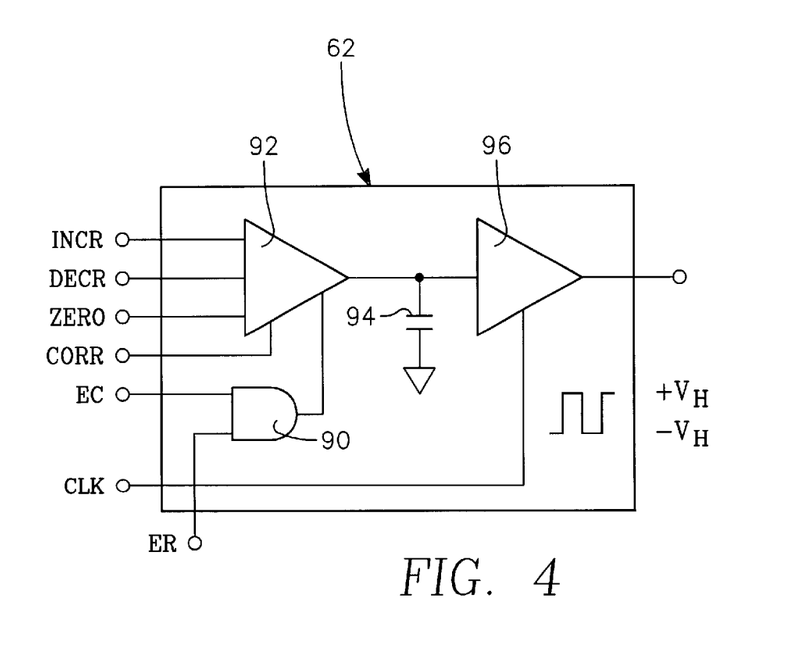
FIG. 4 is a functional schematic diagram of one of the actuator drivers.

A functional schematic diagram of the individual ESA driver 62 is illustrated in FIG. 4. An AND gate 90 receives the one-bit $R_i$ and $C_j$ row and column signals for the (i, j)-th element of the array, and its output, if both inputs are TRUE, enables a high-voltage charge pump 92, which is further controlled by the increment signal INCR, the decrement signal DECR, and the zero signal ZERO. The charge pump 92 receives the analog correction signal CORR and delivers a corresponding amount of positive or negative charge to a hold capacitor 94 having a capacitance $C_H$. The sign of the delivered charge is determined by which of the increment and decrement signals, INCR, DECR signals is valid. On the other hand, if the zero signal ZERO is valid, the charge pump 92 grounds out the capacitor 94.

Thereby, a voltage $V_H$ is established on the capacitor, which is the amount of deflection desired for the MEMS element. However, the voltage $V_H$ is chopped by being passed through a high-voltage selectable inverter 96 under the control of the ESA clock signal CLK, which should have a 50% duty cycle. The result is a bipolar, square wave signal oscillating between values of $+V_H$ and $-V_H$ with equal periods for the two polarities. This ESA signal is applied, for example, to the electrode 78 of the mirror 12 of FIG. 2 in opposition to the grounded doped area 58 of the tiltable mirror 12. The amount of deflection of the electrostatic capacitive element of FIG. 2 is independent of the sign of the voltage being applied across its electrodes as long as charging effects are avoided. The frequency of the ESA clock signal CLK may therefore be significantly less than the resonant frequency of the microactuators. The reduction of frequency is limited by the discharging characteristics of the microactuators. Such low-frequency operation allows the power dissipation by the inverter 96 to be relatively low.

The accuracy of the system would be increased if the analog hold capacitor 94 were replaced by a digital memory associated with each cell. However, this digital approach then requires that each cell contain its own D/A converters, which would require an excessively large die area and high power consumption. Alternatively, a bus of analog power voltages could be distributed across the chip and selected by a digitally controlled demultiplexer.

However, to achieve the same course and fine resolution possible with the described analog approach requires an excessively large interconnect area.

Although the circuitry used to implement the functions of FIG. 4 may be substantially different from that suggested by the diagram, the operation of the control system can be evaluated with the functional diagram of FIG. 4.

Figure 5:
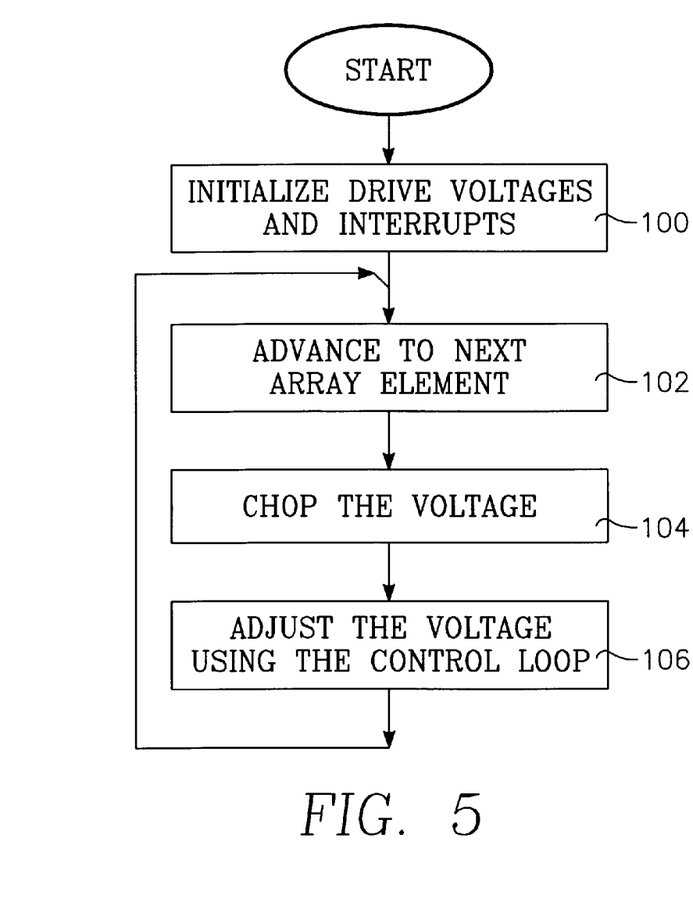
FIG. 5 is a flow diagram of regular execution loop of the actuator control system.

As shown in the flow diagram of FIG. 5, the system is started in step 100 by initializing the drive voltages and interrupts to their initial values. An operating loop is then entered. In step 102, the correction control is advanced to the next element in the array. That is, the address determined by the row and column is incremented, or, if the last element of the array has been corrected, the loop returns to the first address. In step 104, the actuation voltage is chopped, that is, switched to the other bipolar value if desired. This is an ongoing operation for all elements in the array. The processor can be used to control the frequency of chopping and to insure that the driver outputs are precisely square wave. In step 106, the actuation voltage is adjusted or corrected using the feedback loop from the monitoring system. Thereafter, the loop repeats.

Figure 6:
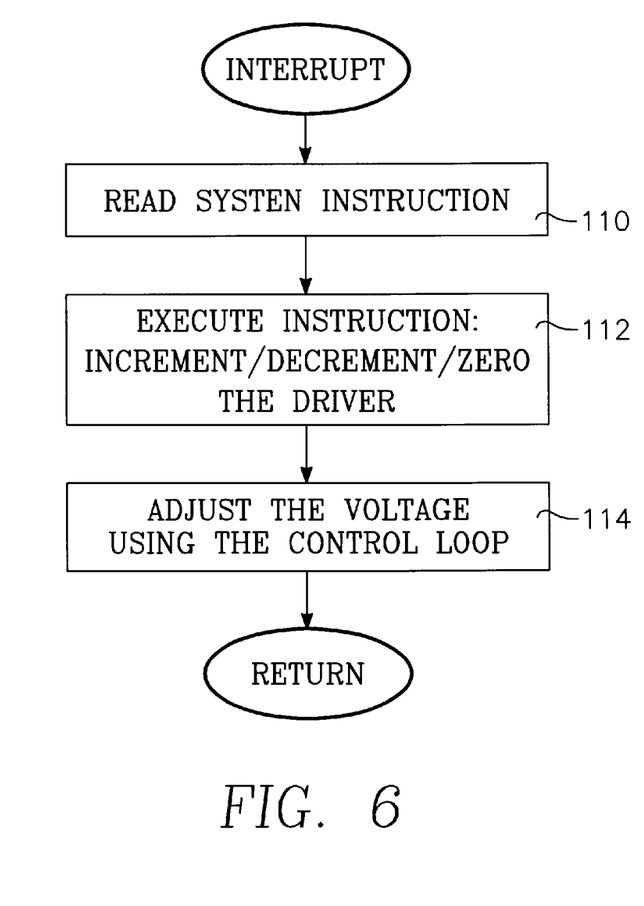
FIG. 6 is a flow diagram of an interrupt routine.

However, the system may issue an interrupt to execute the process of FIG. 6. In step 110, the microprocessor controller reads the system instruction, whether it be to increment or decrement a voltage by a specified amount or to zero the driver. The former two would be likely used to move one of the mirrors to reflect a change in switching state. In step 114, the driver voltage is finely adjusted using the control loop, for instance, to maximize optical coupling at the new position. The processor then returns to its normal operation of FIG. 5 subject to further interrupts.

In the preferred analog implementation, the hold voltage $V_H$ is expected to experience substantial droop due to leakage currents, particularly in the mirror and microactuator design of FIG. 2, and also due to leakage of the charge pump driver transistors, which is very dependent on the HVIC technology employed. Such leakage requires that each driver cell be periodically refreshed according to the flow chart of FIG. 5. To enable refreshing, the microprocessor must keep its own digital record of the desired actuator position for each element of the array.

The droop rate in turn dictates the refresh rate. The time needed for finely adjusting an actuator position depends primarily on the resonant frequency of the MEMS structure, which can vary widely. Hence, the maximum actuator array size that can be successfully controlled by this approach directly depends on the droop rate and the adjustment time. However, a larger array can be controlled by substantially the same technique by dividing the array into sub-arrays, each having its own controller.

Figure 7:
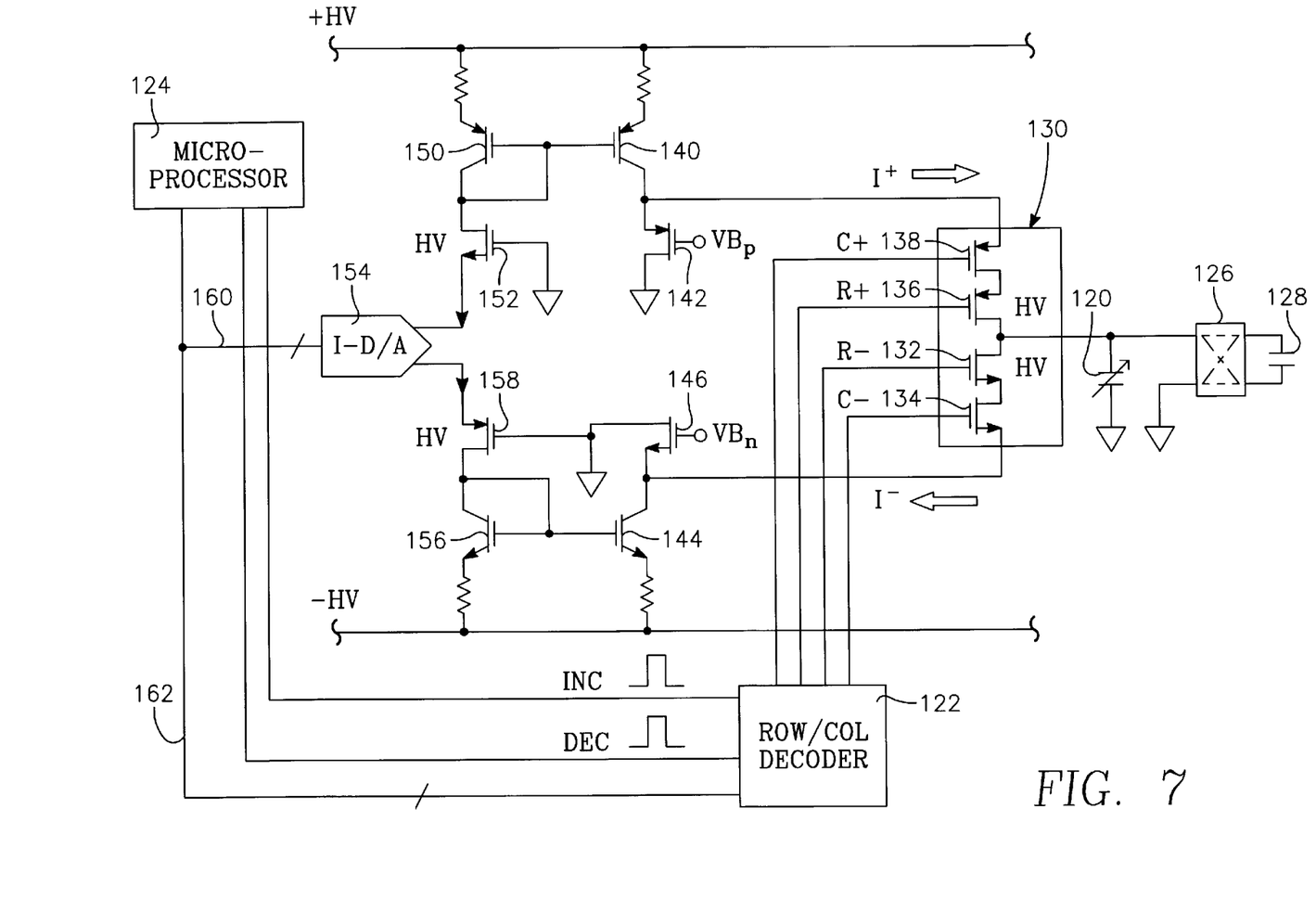
FIG. 7 is a detailed schematic diagram of a controllable current source, one of the array of drivers and actuators, and a multiplexing system.

A practical circuit functionally similar to that of FIGS. 1, 3, and 4 but utilizing conventionally available devices is illustrated in FIG. 7 in which the MEMS element is represented by a capacitor 120, only one of which from the capacitor array is illustrated. The increment and decrement signals have been incorporated into a row/column decoder 122 producing separate incrementing row and column enable signals $R^+$, $C^+$ and decrementing row and column enable signals $R^-$, $C^-$ for the respective rows and columns under the control of a microprocessor 124. Similarly, both a common source current $I^+$ and a common sink current $I^-$ are provided as analog signals available to all the elements of the actuator array.

The inverter is implemented in this design with a 2×2 passive cross-connect 126 interposed between a hold capacitor 128 of capacitance $C_H$ on one side and the actuator capacitor 120 and charging circuitry on the other side. The cross-connect 126 is switchable between two states. In one of the states, a first side of the hold capacitor 128 is connected to 30 the actuator capacitor 120, and the second side of the hold capacitor 128 is grounded. In the other state, the connections are reversed. As a result, the actuator capacitor 128 alternately sees true and inverted versions of the unipolar voltage impressed on the hold capacitor 128. The cross-connect 126 is actuated by the chopping control signal, which may appear as a square-wave clock signal with a 50% duty cycle. If the chopping is done while the charging circuit is disconnected, the value of the capacitance $C_H$ for the hold capacitor 128 must be very much greater than the capacitance associated with the actuator capacitor 120 and any other parasitic capacitance. However, it is possible that the chopping be done by separate system commands instructing the charging circuitry to alternately charge positively and then negatively. Other types of high-voltage selectable inverters are available.

Each cell includes a driver circuit 130 including two NMOS transistors 132, 134 and two PMOS transistors 136, 138 but only the output driver transistors 132, 136 need to be high-voltage transistors. The transistors should be as small as possible. Despite the sizable voltages of up to 200V and currents of up to 20 mA, the transistors do not need to dissipate large currents because each driver is actuated only briefly, such that the time averaged power dissipation is low.

The driver circuit 130 is enabled either by a valid pair of incrementing address signals $C^+$, $R^+$ or a valid pair of decrementing address signals $C^-$, $R^-$ to switch respectively the source current $I^+$ or the sink current $I^-$ through the parallel aligned 2×2 cross-connect 126 to the hold capacitor 128. The hold voltage $V_H$ will increase linearly with time when connected to the source current $I^+$ at a rate of $I^+/C_H$ or in the alternative connection will decrease linearly with time at a rate of $I^-/C_H$. Thus, the amount of decrement or increment $\pm \Delta V_H$ is proportional to the pulse width $T_P$ of the enable signal applied to one of the driver transistors 132, 136, here the row enable signal. Thus, the pulse width $T_P$ provides a second method of controlling the amount of charge change, but it is considered preferable to fix $T_P$ at a set value and rely only on the values of the source or sink current.

It is possible to use only a unipolar current and to rely on the 2×2 cross connect 126 to invert it if necessary to alternatively charge or discharge the hold capacitor.

The source current I⁺ is produced by a high-voltage current-source transistor 140 having its emitter connected to a positive high-voltage bus +HV. In the initial state, the source current I⁺ flows through a PMOS clamp transistor 142 to ground when the clamp transistor 142 is biased at gate voltage $VB_P$. The current-source transistor 140 and clamp transistor 142 are serially connected between the high-voltage bus +HV and ground with the source current I⁺ being switched at the connection between them. The gate voltage $VB_P$ switching the clamp transistor 142 is just sufficiently negative with respect to the high-voltage bus +HV to insure saturation of the current-source transistor 140. While the source current is flowing to ground, first the row/column decoder 122 asserts the increment column enable signal C⁺, that is, lowers it sufficiently below $VB_P$. Then, the decoder asserts the increment row enable signal R⁺, that is, lowers it sufficiently below $VB_P$.

The sink current I⁻ is similarly produced in a complementary fashion by current-sink transistor 144 and clamp transistor 146 controlled by gate voltage $VB_n$ and switched by decrementing row and column signals R⁻, C⁻ to decrement the hold voltage $V_H$. Typically, the gate voltages $VB_P$ and $VB_N$ are not switched but remain constant.

Each of the actuators in the actuator array is associated with one actuator capacitance 120 and requires its own 2×2 cross connect 126, hold capacitor 128, and driver circuit 130.

The source and sink currents I⁺ and I⁻ are delivered to two electrical lines that are connected to all of the driver circuits 130 in the array of actuators. However, one or the other of the currents activate one of the actuators only when that actuator has been selected by the address enable signals from the decoder 122. As a result, a variable (i.e., analog) power signal is multiplexed between a large number of actuators in the array. Preferably, as described, the magnitude of the power signal is varied according to the selected actuator in the array. The source and drain current act to modify the amount of charge or voltage on hold capacitor 128. Further, the source and drain current can increment and decrement the impressed charge and hence to only thereby only partially modify the impressed voltage.

The hold voltage $V_H$ can be zeroed by simultaneously closing all switches with the high-voltage cross connect 126.

The value of the source-current I⁺ is determined by a current mirror between the current-source transistor 140 and a matched mirror transistor similarly connected to the high-voltage bus +HV and having their gates commonly connected to the other principal input to the mirror transistor and to a high-voltage transistor 152 connected in a cascode arrangement with the mirror transistor 150.

The current through the cascoded transistors 150, 152 is determined by one of the outputs of a stereo current-output D/A converter 154 receiving a digital input from the microprocessor 124 to ultimately determine the ramp rate and hence the magnitude of the increment or decrement of charge on the hold capacitor 128. The high-voltage transistor 154 isolates the D/A converter 154 from the high-voltage bus +HV and cascoded transistors 150, 152 also isolate the D/A converter 154 from the high-power supply transistors 140, 142. Accordingly, the D/A converter has only modest voltage and power requirement. An 8-bit input D/A converter provides better than 1% resolution, and 6 bits may be adequate.

The current-output D/A converter 154 provides two complementary analog control currents of opposite signs. One is the source current control current; the other is the sink current control current. The sink current control current is delivered to mirror transistor 156 and high-voltage transistor 158 of complementary polarity to and arranged in complementary fashion to the transistors 150, 152 for the control of the source current.

The microprocessor 124 delivers a digital control signal to the current-output D/A converter 154 over a multi-bit bus 160 and also delivers an address to the row/column decoder 122 over a multi-bit bus 162. The decoder 122 produces separate incrementing and decrementing row enable signals R⁺, R⁻ because they are separately asserted depending upon the increment and decrement control signals. Similarly, the decoder 122 must produce separate column enable signal C⁺, C⁻. The low-level address signals delivered to the decoder 122 must also be level shifted by shifting circuits to the levels associated with the transistors 132, 134, 136, 138 in the driver circuit 130 although the swings need not be amplified. Separate level shifters need to be provided for the two row enable signals R⁺, R⁻ supplied to the high-voltage transistors 132, 136 because they are separately asserted, but a single level shifter suffices for the two column enable signals C⁺, C⁻ because both may be simultaneously asserted without gating a current through both.

The 2×2 cross connect 126 converts the unipolar hold voltage $V_H$ to a bipolar square wave, that is, chops the voltage, under the control of an unillustrated chopping clock signal control the cross connect 126. Each time the switch settings of the cross connect 126 are reversed, the ESA capacitor sees a switch between $\pm V_H$. This fundamentally passive chopping approach consumes relatively low power. In principle, no power is supplied in the chop transition. In actuality, power is consumed in charging the ESA capacitor 120 as well as any parasitic capacitance associated with the transistors of the cross-connect 122 to the opposite polarity. As a result, the hold voltage $V_H$ decays with time, and the droop must be compensated by periodically recharging the hold capacitor 128. We have found that the parasitic capacitance of the cross-connect in a discrete embodiment is approximately 100 pF so that a hold capacitance $C_H$ of 100 nF is required to limit voltage loss to 0.1% per chop. The memory effect can be substantially eliminated by chopping at the rate of at least once per second, but droop and leakage present larger problems requiring the large hold capacitance.

The invention thus allows an efficient control system to be included in a simple structure having a large number of microactuators. The design further allows a bipolar drive signal controlled with a single hold capacitor.

What is claimed is:

1. A control system in an electrostatic actuator array, comprising:

a first plurality of electromechanical elements formed in a substrate and having respective movable mechanical elements forming part of respective actuator capacitors;

a first plurality of hold capacitors coupled to said respective ones of said actuator capacitors:

a first plurality of selectable inverters coupling respective hold capacitors to respective actuator capacitors;

a common source of a selectably variable analog drive power signal, wherein said common source of said selectably variable analog drive power signal comprises a digital to analog converter producing a signal selectively controlling a magnitude of said common source of said selectably variable analog drive power signal;

a first plurality of driver circuits all receiving said drive power signal and including a switching path connected to respective ones of said hold capacitors controlled according to address signals supplied to said driver circuits; and at least one address decoder providing distinctive address signals to said driver circuits.

2. The control system of claim 1, further comprising a processor providing a correction signal for a selected one of said electromechanical elements to digital inputs of said digital to analog converter.

3. The control system of claim 1, wherein said mechanical elements are tiltable mirrors coupling optical signals from input ports to output ports.

4. The control system of claim 3, further comprising:

an optical detection system detecting an intensity of an optical signal on at least one of said output ports; and a processor receiving a signal from said optical detection system indicating said intensity and in response thereto providing a correction signal for a selected one of said actuator capacitors to digital inputs of said digital to analog converter.

* * * * *